(12) United States Patent
El Zakhem (10) Patent No.: US 9,337,596 B2
(45) Date of Patent: May 10, 2016

(54) SYSTEMS AND METHODS FOR ALIGNING A GROUND STAB

(71) Applicant: ROCKWELL AUTOMATION TECHNOLOGIES, INC., Mayfield Heights, OH (US)

(72) Inventor: Francois Radwan El Zakhem, Lake Geneva, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/330,916

(22) Filed: Jul. 14, 2014

(65) Prior Publication Data

US 2016/0013601 A1 Jan. 14, 2016

(51) Int. Cl.
*H01R 13/648* (2006.01)
*H01R 25/16* (2006.01)
*H01R 13/631* (2006.01)
*H01R 43/00* (2006.01)

(52) U.S. Cl.
CPC ............ *H01R 25/162* (2013.01); *H01R 13/631* (2013.01); *H01R 43/00* (2013.01)

(58) Field of Classification Search
CPC ........ H01R 13/743; H01R 25/16; H02B 1/20; H02B 1/21; H02B 1/32; H02B 1/34; H02B 1/36; H02B 13/025
USPC .......................................................... 439/94
See application file for complete search history.

(56) References Cited

U.S. PATENT DOCUMENTS

| | | | | |
|---|---|---|---|---|
| 2,786,908 A * | 3/1957 | Carlson et al. | ............... | 200/50.2 |
| 3,168,683 A * | 2/1965 | Brokaw | ........................ | 361/608 |
| 3,219,887 A * | 11/1965 | Gerg et al. | ..................... | 361/675 |
| 3,263,131 A * | 7/1966 | Rowe | ............................. | 361/675 |
| 3,311,793 A * | 3/1967 | Kussy et al. | .................... | 361/638 |
| 3,626,253 A * | 12/1971 | Sturdivan | ...................... | 361/608 |
| 4,097,103 A * | 6/1978 | Krause | .......................... | 439/213 |
| 4,121,276 A * | 10/1978 | Kovatch et al. | ............... | 361/614 |
| 4,180,845 A * | 12/1979 | Shariff et al. | ................. | 361/624 |
| 4,307,304 A * | 12/1981 | Kovatch et al. | ............... | 307/147 |
| 4,447,858 A * | 5/1984 | Farag et al. | .................... | 361/829 |
| 4,472,761 A * | 9/1984 | Koslosky et al. | ............. | 361/638 |
| 4,789,344 A * | 12/1988 | Fritsch et al. | ................... | 439/43 |

(Continued)

FOREIGN PATENT DOCUMENTS

| | | |
|---|---|---|
| DE | 29505243 U1 | 7/1996 |
| WO | 2014085123 A1 | 6/2014 |

OTHER PUBLICATIONS

Ep Extended Search Report Mailed Nov. 16, 2015.

*Primary Examiner* — Abdullah Riyami
*Assistant Examiner* — Vladimir Imas
(74) *Attorney, Agent, or Firm* — Fletcher Yoder P.C.

(57) ABSTRACT

A motor control center system is provided. The system includes an electrical enclosure configured to house one or more compartments. The electrical enclosure includes a vertical ground bus adjacent to the one or more compartments. The component unit is removably disposed within a compartment of the electrical enclosure. The system also includes a ground stab system disposed on an exterior surface of the component unit. The ground stab system is configured to operatively couple with the vertical ground bus when the component unit is inserted into the compartment of the electrical enclosure, and the ground stab system includes an alignment bracket configured to align the ground stab system with the vertical ground bus.

18 Claims, 5 Drawing Sheets

(56) References Cited

U.S. PATENT DOCUMENTS

| | | | |
|---|---|---|---|
| 4,795,358 A * | 1/1989 | Lyles | 439/247 |
| 4,845,589 A | 7/1989 | Weidler et al. | |
| 5,295,041 A * | 3/1994 | Metivier et al. | 361/622 |
| 5,510,960 A * | 4/1996 | Rosen | 361/823 |
| 5,640,295 A * | 6/1997 | Harris et al. | 361/644 |
| 5,677,830 A * | 10/1997 | Nogas et al. | 361/790 |
| 5,905,631 A * | 5/1999 | Winkler | 361/641 |
| 5,926,370 A * | 7/1999 | Cromwell | 361/700 |
| 6,040,976 A * | 3/2000 | Bruner et al. | 361/611 |
| 6,111,745 A * | 8/2000 | Wilkie et al. | 361/605 |
| 6,233,159 B1 * | 5/2001 | Harman et al. | 361/825 |
| 6,273,750 B1 * | 8/2001 | Malkowski, Jr. | 439/499 |
| 6,297,962 B1 * | 10/2001 | Johnson et al. | 361/726 |
| 6,301,095 B1 * | 10/2001 | Laughlin et al. | 361/624 |
| 6,351,375 B1 * | 2/2002 | Hsieh et al. | 361/679.33 |
| 6,381,122 B2 * | 4/2002 | Wagener | 361/611 |
| 6,487,091 B2 * | 11/2002 | Malkowski et al. | 361/826 |
| 6,512,669 B1 * | 1/2003 | Goodwin et al. | 361/601 |
| 6,638,116 B2 * | 10/2003 | Byron et al. | 439/843 |
| 6,717,076 B2 * | 4/2004 | Narusevicius et al. | 200/50.24 |
| 6,781,818 B2 * | 8/2004 | Josten et al. | 361/611 |
| 6,880,877 B2 * | 4/2005 | Sawayanagi et al. | 296/97.9 |
| 6,934,147 B2 * | 8/2005 | Miller et al. | 361/611 |
| 7,063,572 B2 * | 6/2006 | Brandt et al. | 439/638 |
| 7,140,702 B2 * | 11/2006 | Byron et al. | 312/296 |
| 7,417,848 B2 * | 8/2008 | Bergmann et al. | 361/624 |
| 7,440,260 B2 * | 10/2008 | Parker et al. | 361/620 |
| 7,511,946 B2 * | 3/2009 | Malkowski et al. | 361/648 |
| 7,601,030 B2 * | 10/2009 | Patel | 439/620.3 |
| 7,719,823 B2 * | 5/2010 | Josten et al. | 361/611 |
| 7,791,890 B2 * | 9/2010 | Ishida | 361/727 |
| 7,952,026 B2 * | 5/2011 | Ramsey | 174/68.2 |
| 8,014,131 B2 * | 9/2011 | Hudgins et al. | 361/637 |
| 8,094,435 B2 * | 1/2012 | Howes et al. | 361/614 |
| 8,134,070 B2 * | 3/2012 | Hirschfeld | 174/72 B |
| 8,274,782 B2 * | 9/2012 | Blodorn et al. | 361/622 |
| 8,420,935 B2 * | 4/2013 | Malkowski et al. | 174/72 B |
| 8,616,902 B2 * | 12/2013 | Li et al. | 439/110 |
| 8,664,530 B2 * | 3/2014 | Ross et al. | 174/99 B |
| 8,952,252 B2 * | 2/2015 | Bugaris et al. | 174/50 |
| 9,019,701 B2 * | 4/2015 | Ning et al. | 361/679.48 |
| 2007/0109731 A1 * | 5/2007 | Bergmann et al. | 361/624 |
| 2012/0097413 A1 * | 4/2012 | Bugaris et al. | 174/50 |

* cited by examiner

SYSTEMS AND METHODS FOR ALIGNING A GROUND STAB

BACKGROUND

The invention relates generally to the field of electrical enclosures, such as enclosures for motor control centers (MCCs) used in industrial and commercial settings. More particularly, embodiments of the present invention relate to systems and methods for aligning a ground stab of an MCC.

Electrical enclosures and cabinets can be used in a wide range of industrial and automation applications. One type of electrical enclosure typically referred to as an MCC, houses various switch gears, control devices, protective circuit devices, programmable logic or automation controllers, motor drives, and so forth. These types of electrical enclosures may be subdivided into compartments, bays, drawers or the like (e.g., sometimes referred to as "buckets"). Typical MCCs include access to various structures at certain locations in the rear section of the enclosure. For example, the electrical enclosure may be supplied with power by power buses that extend generally in a plane toward the rear of the enclosure. There may be multiple locations in the rear of the enclosure where compartment supports (e.g., buckets) may be slid into place and plugged into the power buses.

In this manner, conventional enclosures include multiple compartment supports or buckets that are withdrawn or inserted into the enclosure. However, a particular challenge in the design and operation of the electrical enclosures relates to the potential misalignment that occurs when the buckets are withdrawn or inserted into the enclosure. Accordingly, it may be desirable to include systems and methods that help reduce this potential misalignment.

BRIEF DESCRIPTION

Certain embodiments commensurate in scope with the originally claimed invention are summarized below. These embodiments are intended only to provide a brief summary of possible forms of the invention. Indeed, the invention may encompass a variety of forms that may be similar to or different from the embodiments set forth below.

In one embodiment, a motor control center system is provided. The system includes an electrical enclosure configured to house one or more compartments. The electrical enclosure includes a vertical ground bus adjacent to the one or more compartments. The component unit is removably disposed within a compartment of the electrical enclosure. The system also includes a ground stab system disposed on an exterior surface of the component unit. The ground stab system is configured to operatively couple with the vertical ground bus when the component unit is inserted into the compartment of the electrical enclosure, and the ground stab system includes an alignment bracket configured to align the ground stab system with the vertical ground bus.

In another embodiment, a motor control center system is provided. The system includes an electrical enclosure configured to house one or more compartments. The electrical enclosure includes a vertical ground bus adjacent to the one or more compartments. The component unit is removably disposed within a compartment of the electrical enclosure. The system also includes a ground stab system disposed on an exterior surface of the component unit. The ground stab system includes a ground stab configured to operatively couple with the vertical ground bus when the component unit is inserted into the compartment of the electrical enclosure. The ground stab system also includes an alignment bracket configured to align the ground stab with the vertical ground bus.

In another embodiment, a method is provided. The method includes inserting a component unit into a compartment of an electrical enclosure. The method also includes aligning a ground stab system disposed on an exterior surface of the component unit to a vertical ground bus disposed within the electrical enclosure. Aligning the ground stab system includes inserting the vertical ground bus through one or more prongs of an alignment bracket of the ground stab system and engaging a ground stab of the ground stab system to the vertical ground bus to ground one or more electrical components disposed within the component unit. The one or more prongs of the alignment bracket are configured to align the vertical ground bus and the ground stab.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
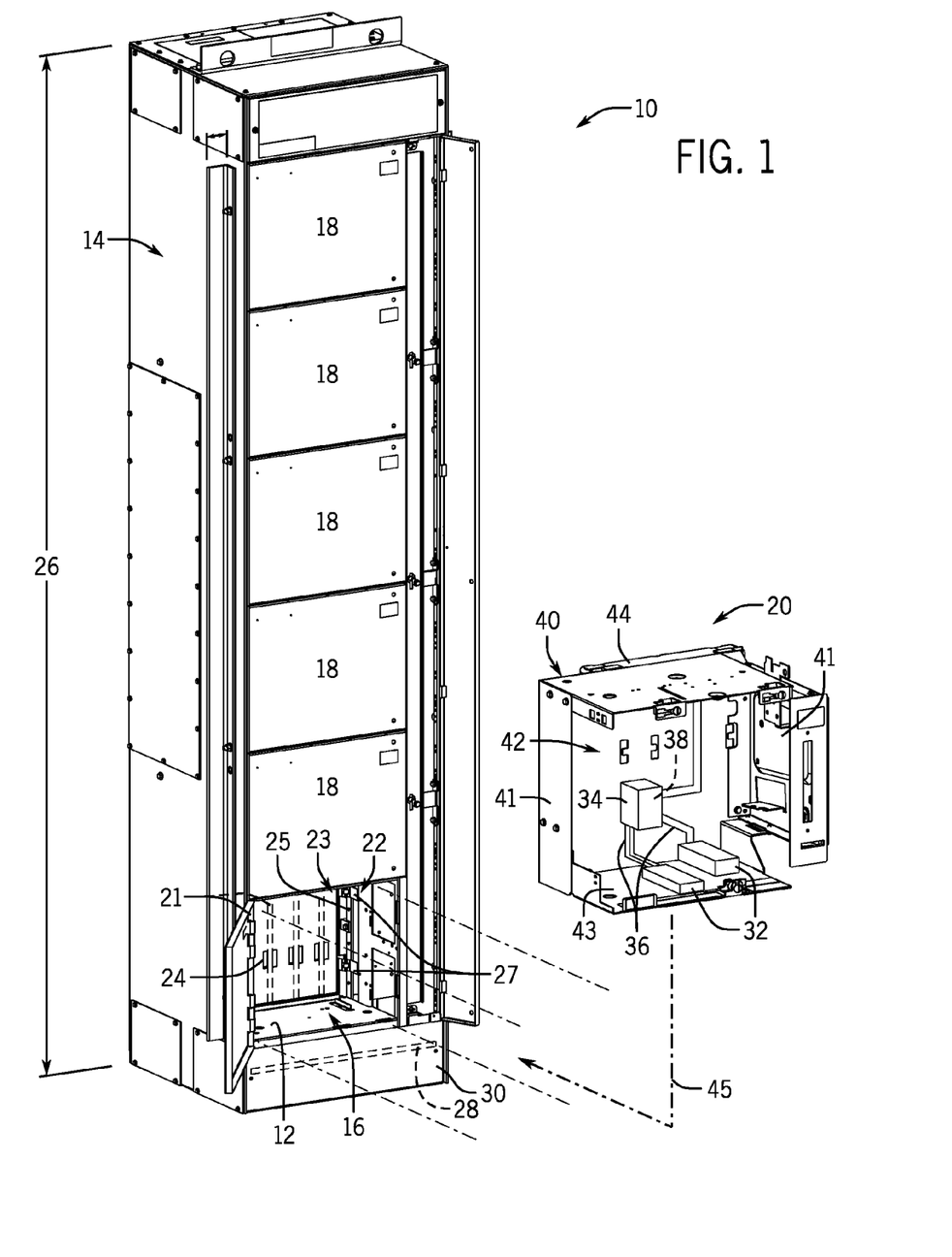
FIG. 1 is a perspective view of an embodiment of an electrical enclosure in accordance with an embodiment.

FIG. 1 depicts an embodiment of an electrical enclosure 10 subdivided into a plurality of compartments 12. As noted above, the enclosure 10 may house a range of electrical circuitry, such as, electrical and electronic components, switchgear, and so forth, within each compartment 12. In certain embodiments, the enclosure 10 may be configured as MCC, such as for industrial control of motors and other loads. It should be noted that, as used herein, the terms "motor control center" and "MCC" should include any suitable type of industrial, marine, commercial and other enclosure in which supports are provided for components in a compartmentalized fashion and interface with bus structures provided in the enclosure 10.

The enclosure 10 may be any suitable type and size. In a conventional MCC, for example, the enclosure 10 may define a shell 14 that encloses an internal volume 16 in which the compartments 12 are subdivided. The shell 14 may be formed of one or more panels of heavy gauge sheet metal connected together, for example, via flanges and fasteners. Each compartment 12 typically has standard dimensions, particularly various standard heights. The relative shapes, sizes, and numbers of compartments 12 within a shell 14 may vary. Depending upon the associated components to be mounted in each compartment 12, the enclosure 10 may be provided with doors 18 that permit individual compartments 12 to be opened for access to the components located therein. In particular, the enclosure 10 may include buckets 20 (e.g., plug-in units 20 or component units 20), which may be inserted into the compartments 12. Latches may be disposed on the buckets 20 and may be used to secure each bucket 20 within the compartment 12 of the enclosure 10.

In certain embodiments, the enclosure 10 includes a series of power buses 21 (shown in dashed lines in FIG. 1) that route three phases of electrical power at a rear end 22 of the enclosure 10 to the various compartments 12. As will be appreciated by those skilled in the art, the power buses 21 may be provided behind a bus cover 23 that limits access to the buses when energized. In addition, slots 24 may be provided in pairs, with a number of such rows of such slots being provided for plugging the supports of the component 20 into electrical contact with the buses. In general, the buckets 20 may include stabs that extend through the slots 24 to make contact with the power buses 21 when they are inserted into the compartments 12, as further described below.

In addition, in certain embodiments, the enclosure 10 includes ground buses, such as a vertical ground bus 25 that extends at least partially along a length 26 of the enclosure 10 adjacent to each of the compartments 16. The vertical ground bus 25 may be constructed of copper and may be affixed to one or more side supports 27. Furthermore, in certain embodiments, the enclosure 10 also includes one or more horizontal ground buses. For example, a horizontal ground bus 28 may extend horizontally along a bottom section of the enclosure 10, generally behind the bottom wireway cover 30. The horizontal ground bus 28 may be connected to the vertical ground bus 27, which may provide additional strength and support for the enclosure 10. Further, in some situations, the horizontal ground bus 28 may be configured to couple one or more enclosures 10 across the bottom sections, such that the grounds of multiple enclosures 10 are connected. In general, the buckets 20 may also include ground stabs that make contact with the vertical ground bus 25 when the buckets 20 are inserted into the compartments 12, as further described below.

In certain embodiments, each bucket 20 may include one or more equipment pieces 32, such as relays, motor starters, circuit breakers, variable frequency drives, programmable logic controllers (PLCs), or the like, that provide functionality for controlling a system or process. Each bucket 20 also may include one or more stabs housings 34 that isolate electrical connectors, such as metal power stabs that engage the vertical power buses 21 disposed at the rear 22 of the enclosure 10. For example, the stab housings 34 may isolate power stabs that are configured to extend through slots 24 in the bus cover 23 to engage the vertical power buses 21 located in the rear of the enclosure 10. The bus cover 23 may longitudinally divide the interior of the electrical enclosure 10 into a front portion that houses the compartments 12 and a rear portion that extends between the bus cover 23 and the rear panel of the enclosure 10 to house power bus bars 21 and related components. Wires 36 within the buckets 20 may tie into the stab housings 34 to access the power stabs and provide power from the power stabs to the components 26.

In certain embodiments, the one or more stab housings 34 may also include a ground stab system 38. As further illustrated in FIG. 4, the ground stab system 38 and the power stabs may be disposed on a back surface 40 of the rear panel 42 of the bucket 20. In certain embodiments, the bucket 20 may include one or more side panels 41 and a bottom panel 43. Specifically, the ground stab system 38 may be coupled to an attachment device 44 that is disposed on the back surface 40 of the rear panel 42 of the bucket 20, or may be disposed directly on the back surface 40. Accordingly, when the bucket 20 is inserted into the associated compartment 12 of the enclosure 10 in the first direction 45, the back surface 40 of the bucket 20 may directly contact the bus cover 23 of the enclosure 10. In particular, the power stabs and the ground stab system 38 disposed on the back surface 40 may engage a respective vertical bus along the rear end 22 of the enclosure 10. For example, as noted above, each power stab may be configured to engage each of the slots 24 of the power buses 21. Further, the ground stab system 38 may be configured to engage the vertical ground bus 25.

As noted above, the ground stab system 38 may be configured to help reduce any potential misalignment between the ground stab and the vertical ground bus 25. In such situations, the misalignment between these components may not properly ground components with the enclosure 10. Accordingly, the ground bracket system 38 helps to ensure alignment between the ground stab and the vertical ground bus 25 by not allowing the bucket 20 to be fully inserted into the compartment 16 unless the ground stab system 38 is properly aligned with the vertical ground bus 25.

Figures 2, 3:
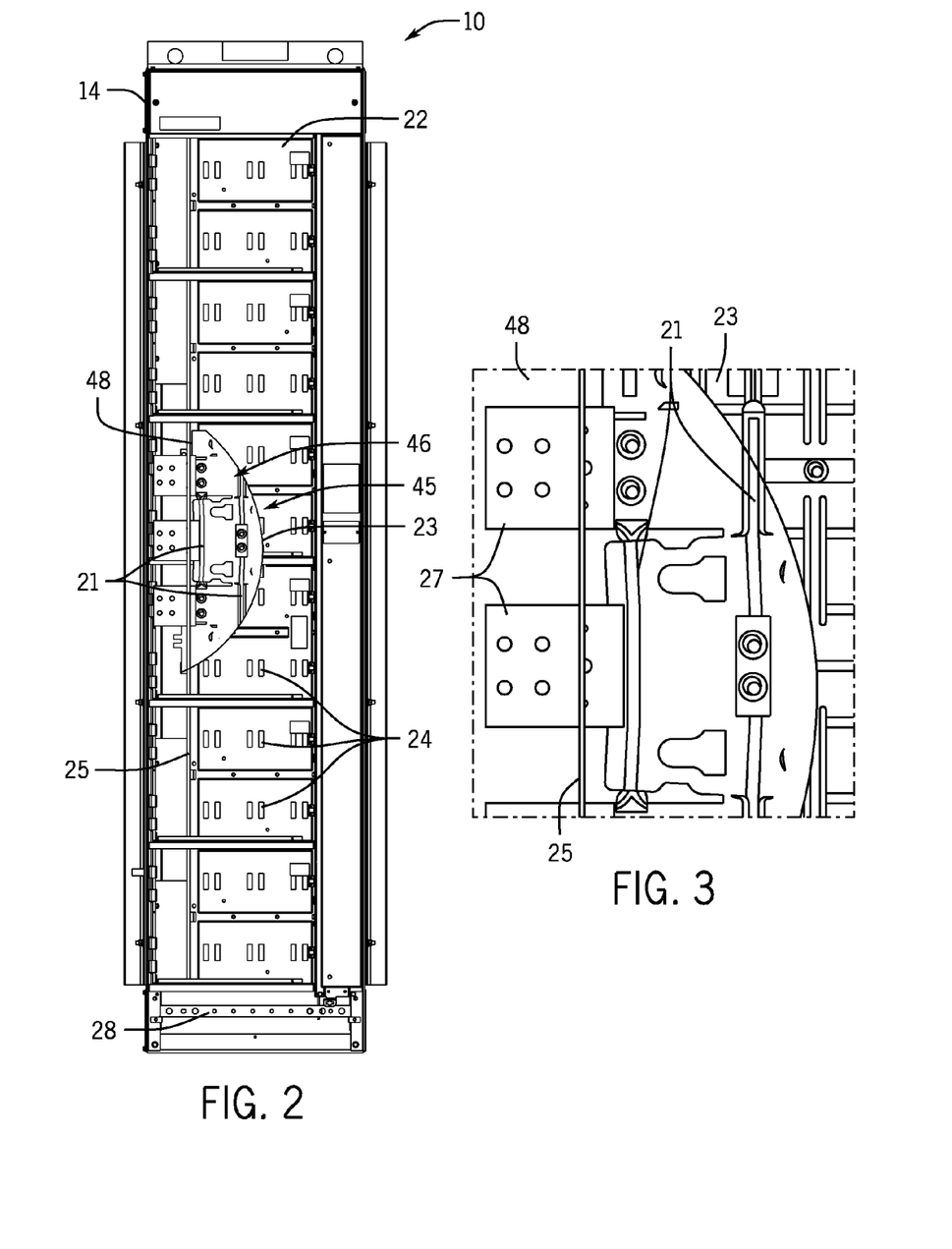
FIG. 2 is a perspective view of an embodiment of the rear of the electrical enclosure of FIG. 1, in accordance with an embodiment.
FIG. 3 is a partially exploded view of a vertical ground bus disposed within the rear of the electrical enclosure of FIG. 2, in accordance with an embodiment.

FIG. 2 is a perspective view of an embodiment of the rear end 22 of the electrical enclosure 10 of FIG. 1, in accordance with an embodiment. In particular, the illustrated embodiment depicts the bus cover 23 of the enclosure 10. The bus cover 23 may longitudinally divide the interior volume 16 of the enclosure 10 into a front portion 45 and a back portion 46. As noted above with respect to FIG. 1, the front portion 45 may be configured to house the compartments 12 and/or the buckets 20 that may be inserted and housed within the compartments 12. Further, the front portion 46 of the enclosure 10 includes one or more slots 24, through which one or more power stabs on the buckets 20 extend through to make contact with the power buses 21 disposed within the rear of the enclosure 10. In certain embodiments, the back portion 46 extends between the bus cover 23 and a rear panel 48, where the rear panel 48 forms an exterior surface of the shell 14. The back portion 46 may be configured to house the power buses 21, the vertical ground bus 25, and related components.

In certain embodiments, the enclosure 10 includes the vertical ground bus 25 which extends at least partially along the length 26 (FIG. 1) of the enclosure 10. The vertical ground bus 25 may be disposed adjacent to each compartment 12, such that it is adjacent to the power buses 21, as further described with respect to FIG. 3.

FIG. 3 is a partially exploded view of the vertical ground bus 25 disposed within the rear end 22 of the electrical enclosure 10 of FIG. 2, in accordance with an embodiment. As noted above in certain embodiments, the vertical ground bus 25 may be affixed to one or more side supports 27 that are disposed parallel to the rear panel 48 of the enclosure 10. Further, the vertical ground bus 25 extends along the length 25 of the enclosure 10, such that each compartment 12 and/or each bucket 20 has access to the vertical ground bus 25. For example, the vertical ground bus 25 may be parallel to the power buses 21 along the length of the enclosure 10. In certain embodiments, the vertical ground bus 25 may be operatively coupled to the horizontal ground bus 28 disposed proximate to the bottom section of the enclosure 10, such as generally behind the bottom wireway cover 30. In particular, the ground stab system 38 disposed on the back surface 40 of the bucket 20 may be configured to operatively couple and align with the vertical ground bus 25, as further described below with respect to FIGS. 4-6.

Figure 4:
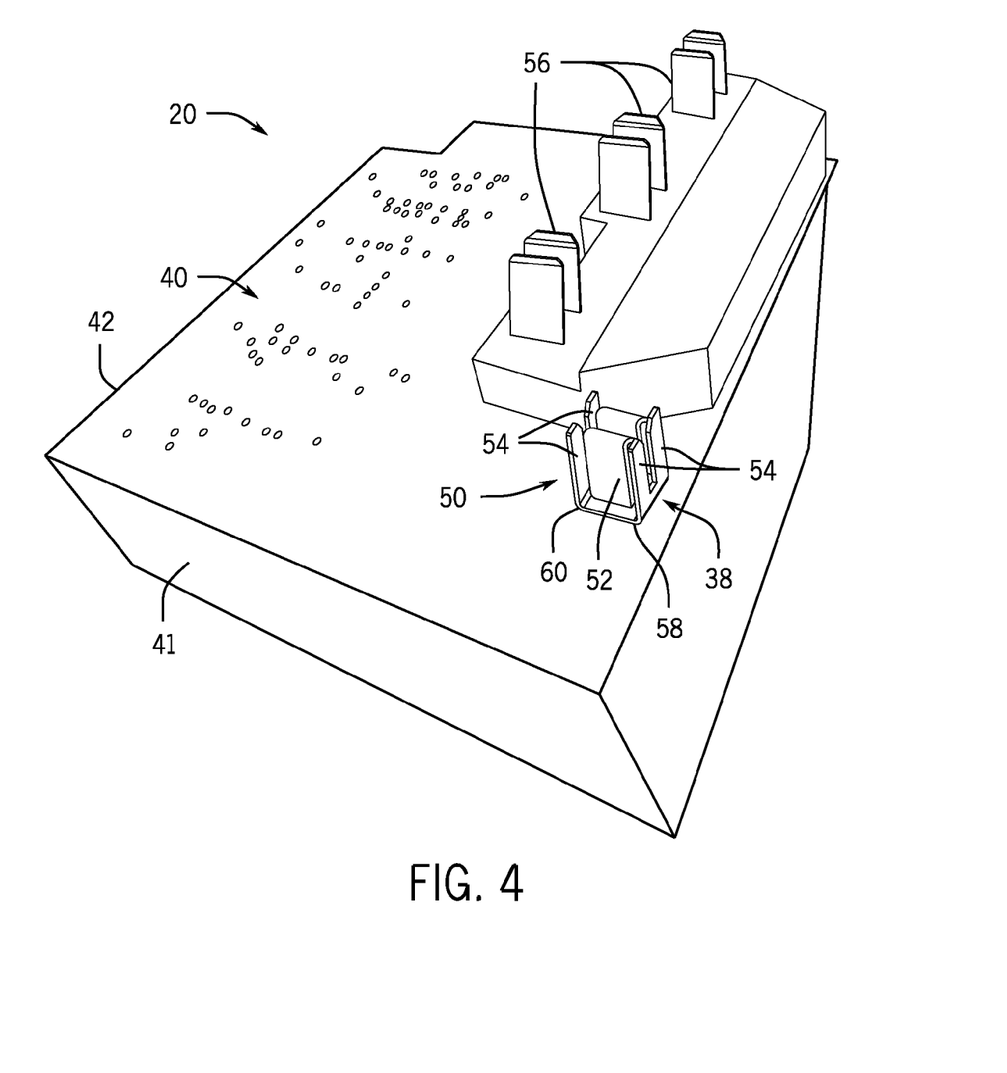
FIG. 4 is a perspective view of a backside of a compartment that may be inserted into the electrical enclosure of FIG. 1, illustrating a ground stab system, in accordance with an embodiment.

FIG. 4 is a perspective view of the back surface 40 of the rear panel 42 of the bucket 20, depicting the ground stab system 38 in accordance with an embodiment. For example, in the illustrated embodiment, the ground stab system 38 is disposed on the back surface 40 of the bucket 20. However, it should be noted that in certain embodiments, the ground stab system 38 may be disposed on the attachment device 44. Likewise, the power stabs 56 may be disposed on the attachment device 44 and/or may be disposed directly on the back surface 40 of the bucket 20. In particular, the ground stab system 38 includes an alignment bracket 50 and a ground stab 52. The alignment bracket 50 may be operatively coupled to the ground stab 52. In certain embodiments, the alignment bracket 50 includes one or more prongs 54 configured to help align the ground stab 52 to the vertical ground bus 25 within the enclosure 10.

As noted above, in certain embodiments, one or more buckets 20 may be inserted or withdrawn from the compartments 12 of the enclosure 10. For example, as the bucket 20 is inserted into the enclosure 10 in the first direction 45, the power stabs 56 disposed on the back surface of the bucket 20 may engage the vertical power buses 21 disposed within the rear of the enclosure 22. Indeed, each power stab 56 disposed on the bucket 20 may be configured to engage a respective vertical power bus 21 within the enclosure 10. Further, when the bucket 20 is engaged with the power buses 21, the power buses 21 may be configured to deliver three phase ac power to the bucket 20 via the electrical connection formed. In particular, as the bucket 20 is inserted into the enclosure 10 in the first direction 45, the ground stab assembly 38 disposed on the back surface 40 may engage the vertical ground bus 25 disposed within the rear of the enclosure 22. Indeed, as noted above, the ground stab assembly 38 includes the alignment bracket 50 that is configured to align the ground stab 52 as the ground stab 52 is being coupled to the vertical ground bus 25. Likewise, when the bucket 20 is disengaged with the power buses 21 (e.g., the bucket 20 is withdrawn from the enclosure 10) the electrical connection may be terminated such that the bucket 20 no longer receives power. Further, when the bucket 20 is withdrawn, the ground stab 52 may be uncoupled and/or disengaged from the vertical ground bus 25 so that the bucket 20 may be removed from the enclosure 10. Similarly, when the unit 20 is inserted or withdrawn from the enclosure 10, various connections on the unit 20 may engage or disengage with the motor bus 32 disposed within the rear of the enclosure 10.

In certain embodiments, the alignment bracket 50 includes one or more prongs 54 and a base portion 58. The base portion 58 may be parallel to the back surface 40 of the bucket 20, and may include one or more flat surfaces that are utilized to secure the base portion 58 to the bucket 20. In addition, the one or more prongs 54 may be approximately normal (e.g., perpendicular) to the base portion 58 and the back surface 40, and may extend away from the back surface 40 of the bucket 20. In the illustrated embodiment, the alignment bracket 50 is one continuous piece that may be formed of one or more types of metals or metal alloys. For example, the alignment bracket 50 may be zinc coated steel, un-coated copper, tin-coated cooper, un-coated steel, etc. The process utilized to form the alignment bracket 50 may include, but is not limited to, a casting process, a extrusion process, a machining process, or any combination thereof. In certain embodiments, the alignment bracket 50 may be formed by bending the continuous piece at one or more locations such that the resulting prongs 54 are approximately perpendicular to the base portion 58. In other embodiments, the prongs 54 may be formed separate from the base portion 58, and may be assembled (e.g., coupled via one or more retaining devices or coupled through a manufacturing process) with the base portion 58.

In the illustrated embodiment, the alignment bracket 50 includes four prongs 54 that form a right angle 60 with the base portion 58 of the alignment bracket 50. However, it should be noted that in other embodiments, the alignment bracket 50 may include any number of pairs of prongs 54, such as two, six, eight, ten, and so forth. In particular, the prongs 54 may be configured to help align the ground stab 52 with the vertical ground bus 25 as the bucket 25 is inserted into the enclosure 10, as further described with respect to FIGS. 5 and 6.

Figure 5:
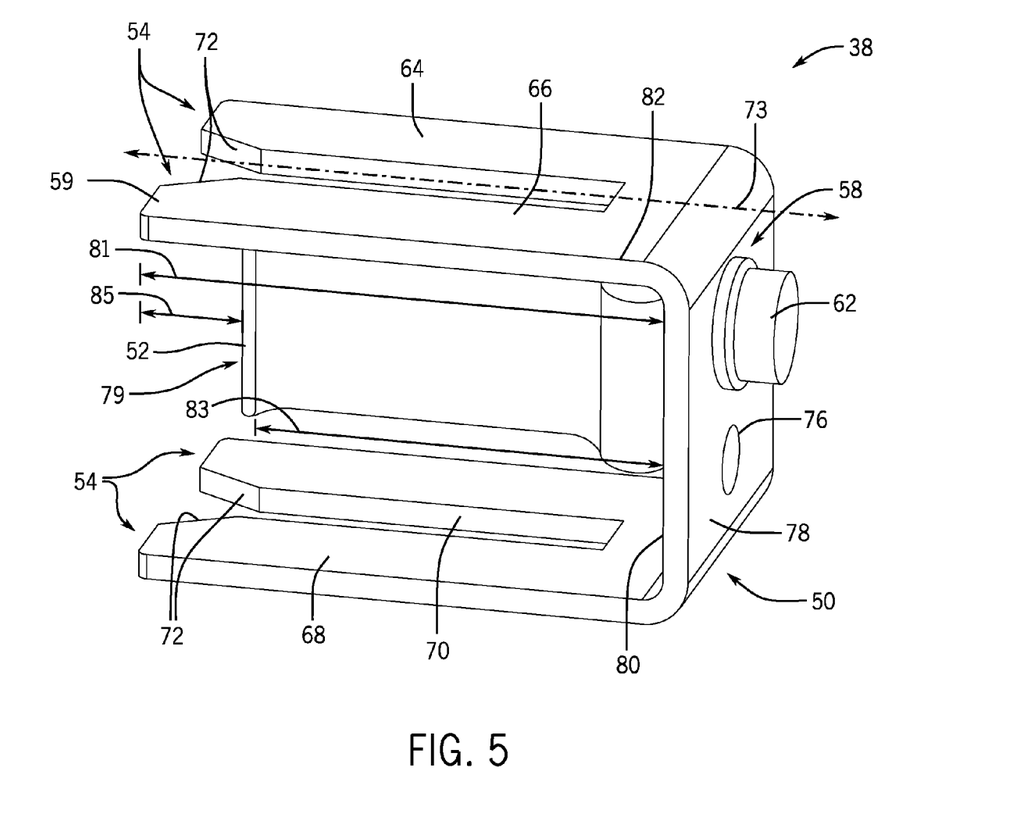
FIG. 5 is a perspective side view of the ground stab system of FIG. 4, in accordance with an embodiment.

FIG. 5 is a perspective side view of the ground stab system 38 of FIG. 4, in accordance with an embodiment. In particular, the ground stab system 38 includes the alignment bracket 50 operatively coupled to the ground stab 52. The alignment bracket 50 may be coupled to the ground stab 52 via one or more retaining devices 62, which may be also be utilized to secure the ground stab system 38 to the back surface 40 of the bucket 20. Further, in the illustrated embodiment, the alignment bracket 50 includes the one or more prongs 54, such as a first prong 64, a second prong 66, a third prong 68, and a fourth prong 70. In particular, each prong 54 includes a tapered edge 72 angled towards the interior of the ground stab system 38, as further described below. The one or more prongs 54 of the alignment bracket 50 may be utilized to help align the ground stab 52 to the vertical ground bus 25 along a longitudinal axis 73.

In certain embodiments, the alignment bracket 50 and the ground stab 52 may be operatively coupled to each other via the one or more retaining devices 62, such as screws, knobs, levers, biased fasteners, latches, snap-fit fasteners, rails, and so forth. In certain situations, the one or more retaining devices 62 utilized to secure the alignment bracket 50 to the ground stab 52 may also be utilized to secure the ground stab system 38 to the bucket 20. For example, the retaining device 62 may be inserted through an aperture 76 disposed on the alignment bracket 50 to secure the ground stab 52 and the alignment bracket 50 to the bucket 20. In certain embodiments, such as when a heavy duty (e.g., copper) ground stab 52 is utilized, two retaining devices 62 may be utilized to secure the ground stab system 38. In some embodiments, such as when a light duty (e.g., brass) ground stab 52 is utilized, one retaining device 62 may be utilized. In this manner, the alignment bracket 50, and more specifically, a portion of the base portion 58 of the alignment bracket 50, is sandwiched between the ground stab 52 and the bucket 20. Specifically, a back face 78 of the base portion 58 is in contact with the back surface 40 of the rear panel 42 of the bucket 20. Further, a front face 80 of the base portion 58 is in contact with a bottom portion 82 of the ground stab 52.

In certain embodiments, an alignment bracket length 81 of the alignment bracket 50 may extend from the base portion 58 to the edge portion 59, where the edge portion 59 includes the front ends of the prongs 54. In particular, in certain embodiments, the alignment bracket length 81 is greater than a ground stab length 83. The ground stab length 83 may extend from the bottom portion 82 of the ground stab 52 to an end portion 79 of the ground stab 52. In certain embodiments, the edge portion 59 of the alignment bracket 50 extends past the end portion 79 of the ground stab 52 by a separation distance 85. Indeed, the separation distance 85 allows the alignment bracket 50 to make physical contact with the vertical ground bus 25 before the ground stab 52. Further, the tapered edges 72 of the alignment bracket 50 are configured to help align the engagement of the vertical ground bus 25 to the ground stab 52. For example, the tapered edges 72 of each prong 54 of the alignment bracket 54 help guide and/or direct the ground stab 52 into the vertical ground bus 25 as the bucket 20 is inserted into the enclosure 10, as further described with respect to FIG. 6. It should be noted that in other embodiments, the each prong 54 may have one or more tapered edges 72, which may be in any shape, size, location, and/or position that aids in guiding and/or aligning the ground stab 52 with the vertical ground bus 25.

Figure 6:
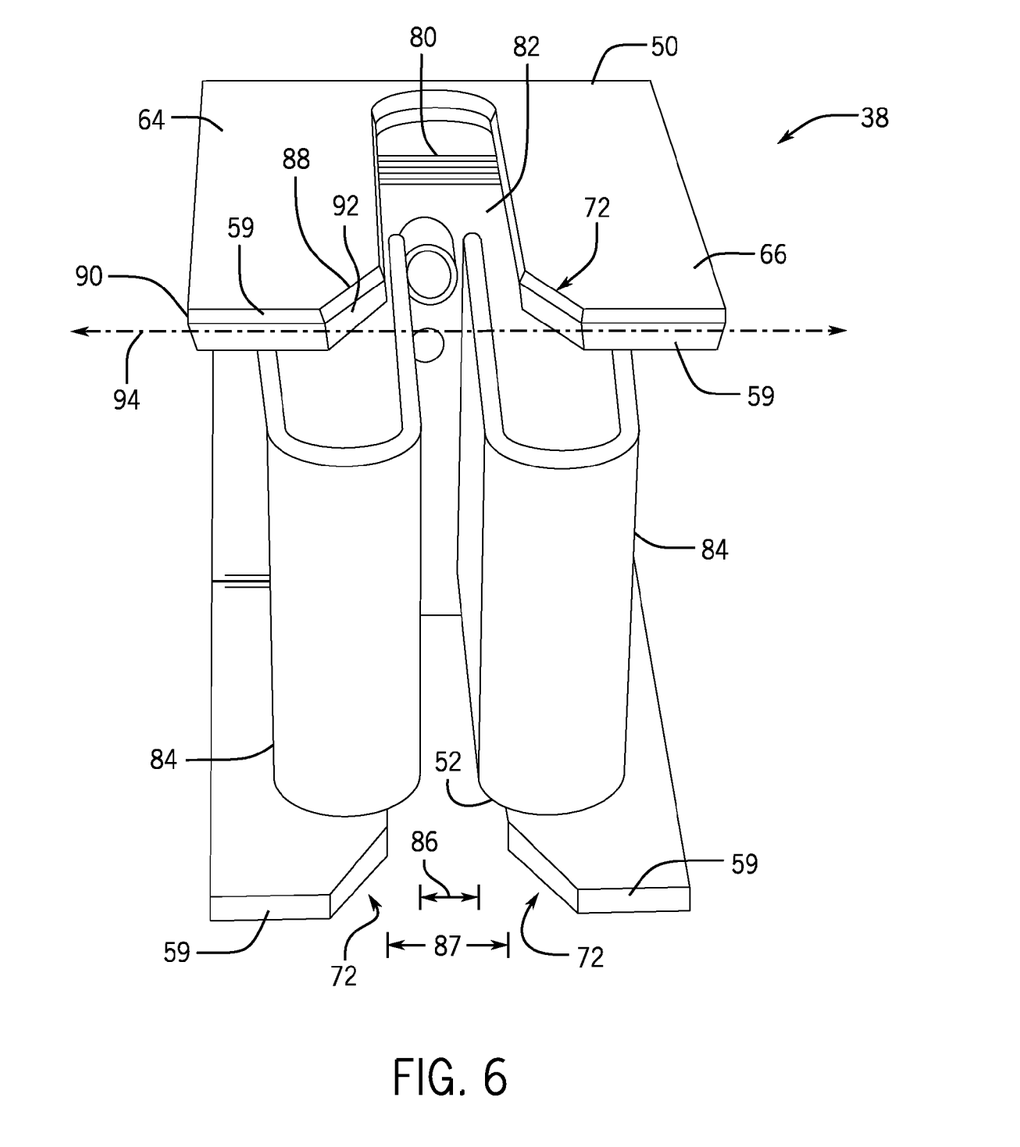
FIG. 6 is a perspective front view of the ground stab system of FIG. 4, in accordance with an embodiment.

FIG. 6 is a perspective front view of the ground stab system 38 of FIG. 4, in accordance with an embodiment. In particular, the ground stab system 38 illustrates the front view of the ground stab 52 that is operatively coupled to the alignment bracket 50 via the one or more retaining devices 62. In particular, as depicted in the illustrated embodiment, at least a portion of the front face 80 of the base portion 58 of the alignment bracket 50 makes contact with the bottom portion 82 of the ground stab 52. While the illustrated embodiment depicts a heave duty ground stab 52, in other embodiments, the ground stab 52 may be a light duty ground stab. In particular, the ground stab 52 includes one or more extensions 84 that extend from the bottom portion 82 of the ground stab 52. Further, the ground stab 52 may be a plug-in stab that includes a ground stab width 86 configured to provide an interference fit with the vertical ground bus 25. Indeed, the vertical ground bus 25 may be configured to fit between both the ground stab width 86 and a prong width 87. It should be noted that the prong width 87 may be configured to compensate for the degree of error and provide a confidence interval for when the bucket 20 is misaligned as it is inserted into the enclosure 10.

In certain embodiments, the ground stab 52 may engage the vertical ground bus 52 before the power stabs 56 engage the power buses 21, and may disengage from the vertical ground bus 52 after the power stabs 56 disengage from the power buses 21. Accordingly, it may be beneficial to provide systems and methods that align the ground stab 52 to the vertical ground bus 25 to ensure that the bucket 20 is properly inserted into the enclosure 10. Accordingly, in certain embodiments, each prong 52 of the alignment bracket 50 may include one or more tapered edges 72 that are configured to help align the vertical ground bus 25 with the ground stab 52. As noted above with respect to FIG. 5, the tapered edges 72 of the alignment bracket 50 extend past the ground stab 52 by the separation distance 85. Accordingly, in certain embodiments, the tapered edges 72 of the alignment bracket 50 make physical contact with the vertical ground bus 25 before the ground stab 52 makes physical contact with the vertical ground bus 25, as the bucket 25 is inserted into the enclosure 10. Further, the geometry, position, and/or size of the tapered edges 72 may help guide and align the ground stab 52 into the vertical ground bus 25.

In the illustrated embodiment, the first prong 64 includes a first tapered edge 88 and an exterior edge 90 distal from the base portion 58 (e.g., the edge portion 59) of the alignment bracket 50. The tapered edge 88 may include a variety of geometries, such as any length, shape, or angle. In particular, the tapered edge 88 may be angled towards the interior of the ground stab system 38, such that the tapered edges 88 may form an acute angle 92 with a horizontal axis 92. In this manner, the edge portions 59 of the alignment bracket 50 (e.g., the edge portion 59 of each prong 54), may be utilized to make physical contact with the vertical ground bus 25 before the ground stab 52, and the tapered edges 72 may be further utilized to help guide and align the ground stab 52 into the vertical ground bus 25 as the bucket 20 is inserted into the enclosure 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor control center system, comprising:
an electrical enclosure configured to house one or more compartments, wherein the electrical enclosure comprises a vertical ground bus adjacent to the one or more compartments;
a component unit removably disposed within a compartment of the electrical enclosure; and
a ground stab system disposed on an exterior surface of the component unit, wherein the ground stab system is configured to operatively couple with the vertical ground bus when the component unit is inserted into the compartment of the electrical enclosure, and wherein the ground stab system comprises an alignment bracket configured to align the ground stab system with the vertical ground bus, wherein the alignment bracket is formed of a continuous sheet of metal that is bent to form a base portion and one or more prong, wherein each of the one or more prongs are approximately perpendicular to the base portion, and wherein a first prong and a second prong are separated by a first distance, and wherein the vertical ground bus is configured to fit through the first distance to operatively engage with the ground stab.

2. The system of claim 1, wherein the ground stab system comprises a ground stab configured to operatively couple with the vertical ground bus for grounding one or more electrical components disposed within the component unit.

3. The system of claim 2, wherein the alignment bracket is configured to align the ground stab with the vertical ground bus when the component unit is inserted into the electrical enclosure.

4. The system of claim 1, wherein a first surface of a base portion of the alignment bracket of the ground stab system is adjacent to the exterior surface.

5. The system of claim 1, wherein a second surface of the base portion of the alignment bracket is adjacent to a ground stab of the ground stab system.

6. The system of claim 5, wherein at least a portion of the alignment bracket is disposed between the ground stab and the exterior surface of the component unit.

7. The system of claim 1, comprising one or more retaining devices configured to secure the ground stab system to the exterior surface of the component unit.

8. The system of claim 1, wherein the first and second prongs each comprise at least one tapered edge configured to align the ground stab with the vertical ground bus when the component unit is inserted into the electrical enclosure.

9. A motor control center system, comprising:
an electrical enclosure configured to house one or more compartments, wherein the electrical enclosure comprises a vertical ground bus adjacent to the one or more compartments;
a component unit removably disposed within a compartment of the electrical enclosure; and
a ground stab system disposed on an exterior surface of the component unit, wherein the ground stab comprises:
a ground stab configured to operatively couple with the vertical ground bus when the component unit is inserted into the compartment of the electrical enclosure; and
an alignment bracket configured to align the ground stab with the vertical ground bus, wherein a first surface of a base portion of the alignment bracket is adjacent to the exterior surface of the component unit.

10. The system of claim 9, wherein the first surface of the alignment bracket is disposed on the exterior surface of a rear panel of the component unit.

11. The system of claim 9, wherein a second surface of the alignment bracket is adjacent to a bottom portion of the ground stab.

12. The system of claim 9, wherein at least a portion of the alignment bracket is disposed between the ground stab and the component unit, and wherein one or more retaining devices are used to secure the component unit to the portion of the alignment bracket and the ground stab.

13. The system of claim 12, wherein the one or more retaining devices comprise a screw, a lever, a knob, a biased fastener, a latch, a snap-fit fastener, a rail, or a combination thereof.

14. The system of claim 9, wherein the alignment bracket comprises one or more prongs and a base portion, and wherein the one or more prongs are substantially perpendicular to the base portion.

15. The system of claim 14, wherein each of the one or more prongs includes at least one tapered edge, and wherein each tapered edge is configured to align the ground stab with the vertical ground bus when the component unit is inserted into the electrical enclosure.

16. A method, comprising:
inserting a component unit into a compartment of an electrical enclosure;
aligning a ground stab system disposed on an exterior surface of the component unit to a vertical ground bus disposed within the electrical enclosure, wherein aligning the ground stab system comprises:
inserting the vertical ground bus through one or more prongs of an alignment bracket of the ground stab system; and
engaging a ground stab of the ground stab system to the vertical ground bus to ground one or more electrical components disposed within the component unit, wherein the one or more prongs of the alignment bracket are configured to align the vertical ground bus and the ground stab.

17. The method of claim 16, wherein inserting the component unit into the electrical enclosure comprises inserting a rear panel of the component unit in a first direction towards the vertical ground bus disposed at a back end of the electrical enclosure, and wherein the ground stab system is disposed on the exterior surface of the rear panel.

18. The method of claim 16, comprising engaging stab housings on the component unit to power buses configured to route electrical power to the component unit after engaging the ground stab system to the vertical ground bus.

* * * * *